United States Patent
Cook et al.

(10) Patent No.: US 8,466,654 B2
(45) Date of Patent: Jun. 18, 2013

(54) WIRELESS HIGH POWER TRANSFER UNDER REGULATORY CONSTRAINTS

(75) Inventors: Nigel Cook, El Cajon, CA (US); Hanspeter Widmer, Solothurn (CH); Lukas Sieber, Olten (CH); David Allred, Ranco Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 731 days.

(21) Appl. No.: 12/498,159

(22) Filed: Jul. 6, 2009

(65) Prior Publication Data
US 2010/0117596 A1   May 13, 2010

Related U.S. Application Data

(60) Provisional application No. 61/078,812, filed on Jul. 8, 2008.

(51) Int. Cl.
*H02J 7/00* (2006.01)
*H02J 7/14* (2006.01)

(52) U.S. Cl.
USPC .................... 320/109; 320/108; 320/104

(58) Field of Classification Search
CPC ............................................. Y02T 90/14
USPC ................................... 320/108, 109
See application file for complete search history.

(56) References Cited

U.S. PATENT DOCUMENTS

| | | | |
|---|---|---|---|
| 5,311,973 A | 5/1994 | Tseng et al. | |
| 5,573,090 A * | 11/1996 | Ross | 191/10 |
| 5,654,621 A | 8/1997 | Seelig | |
| 5,661,391 A | 8/1997 | Ito et al. | |
| 5,821,728 A * | 10/1998 | Schwind | 320/108 |
| 5,821,731 A * | 10/1998 | Kuki et al. | 320/108 |
| 7,741,734 B2 | 6/2010 | Joannopoulos et al. | |
| 7,825,543 B2 | 11/2010 | Karalis et al. | |
| 2011/0221385 A1* | 9/2011 | Partovi et al. | 320/101 |
| 2011/0227530 A1 | 9/2011 | Karalis et al. | |

FOREIGN PATENT DOCUMENTS

| | | |
|---|---|---|
| DE | 4236286 | 5/1994 |
| DE | 102007033654 A1 | 4/2008 |
| EP | 0788212 A2 | 8/1997 |

(Continued)

OTHER PUBLICATIONS

International Search Report and Written Opinion—PCT/US2009/049975, International Search Authority—European Patent Office—Jul. 8, 2008.

(Continued)

*Primary Examiner* — Edward Tso
*Assistant Examiner* — Ahmed Omar
(74) *Attorney, Agent, or Firm* — Knobbe Martens Olson & Bear, LLP (57) ABSTRACT

Improved battery-charging system for a vehicle. Primary and secondary coils are located in places where the vehicle can receive power from the primary coil by pulling into a parking space, for example. The parking space may have a coil embedded in the ground, or may have an array of coils embedded in the ground. A guidance system is disclosed. Fine positioning is also disclosed. The secondary coil in the vehicle can also be raised or lowered to improve coupling.

19 Claims, 5 Drawing Sheets

FOREIGN PATENT DOCUMENTS

| | | |
|---|---|---|
| FR | 2740921 A1 | 5/1997 |
| GB | 2020451 A | 11/1979 |
| GB | 2347801 | 9/2000 |
| JP | 8502640 A | 3/1996 |
| JP | 8126120 A | 5/1996 |
| JP | 8237890 A | 9/1996 |
| JP | 9213378 A | 8/1997 |
| JP | 2007159359 A | 6/2007 |
| JP | 2010508007 A | 3/2010 |
| WO | 9410004 A1 | 5/1994 |
| WO | WO2008051611 A2 | 5/2008 |

OTHER PUBLICATIONS

"Electromagnetic Compatibility and Radio Spectrum Matters (ERM); Short Range Devices (SRD); Radio Equipment in the Frequencey Range 9kHz to 25 MHz and Inductive Loop Systems in the Frequency Range 9 kHz to 30 MHz; Part 2: Harmonized EN Under Article 3.2 of the R&TTE Directive; Final draft ETSI EN 300" ETSI Standards, LIS, Sophia Antipolis Cedex, France, vol. ERM-RP08, No. V1.3.1, Jan. 1, 2006, XP014032134, ISSN: 0000-0001; EETSI EN 300 330-2 v1.3.1 (Jun. 2001).

\* cited by examiner

WIRELESS HIGH POWER TRANSFER UNDER REGULATORY CONSTRAINTS

CLAIM OF PRIORITY UNDER 35 U.S.C. §119

The present Application for Patent claims priority to Provisional Application No. 61/078,812, entitled "WIRELESS HIGH POWER TRANSFER UNDER REGULATORY CONSTRAINTS" filed Jul. 8, 2008, and assigned to the assignee hereof and hereby expressly incorporated by reference herein.

BACKGROUND

Our previous applications describe magnetically resonant transfer of power between antennas. The antennas may be capacitively loaded wire loops or multi-turn coils. These form a resonant antenna that efficiently couples energy from a primary structure (a transmitter) to a distal positioned secondary structure (a receiver) via a magnetic field. Both primary and secondary are tuned to a common resonance frequency.

Our previous applications describe a major issue of wireless power as electromagnetic interference and radiation exposure for human safety. Energy transfer via magnetic field coupling may be mainly constrained by the specified H-field limits. Compliance with these limits may be tested at a defined distance, e.g., 10 m, from the radiating structure.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The detailed description includes specific details for providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted from a transmitter to a receiver without the use of physical electromagnetic conductors.

Figure 1:
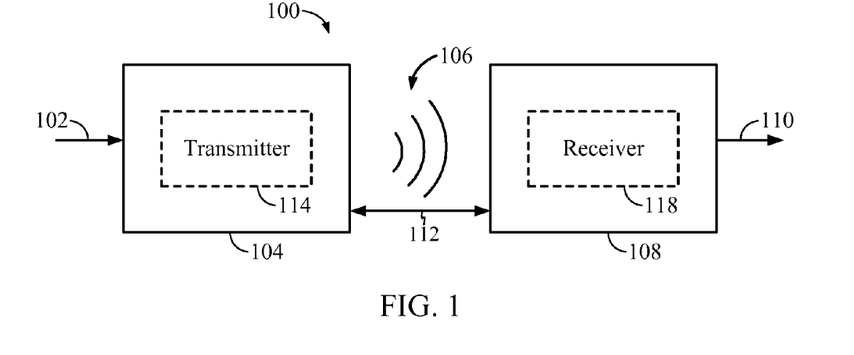
FIG. 1 shows a simplified block diagram of a wireless power transfer system.

FIG. 1 illustrates wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are identical, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. A coupling mode may be developed between the transmit antenna 114 and the receive antenna 118 when in this near-field. The area around the antennas 114 and 118 where this near-field coupling may occur is referred to herein as a coupling-mode region.

Figure 2:
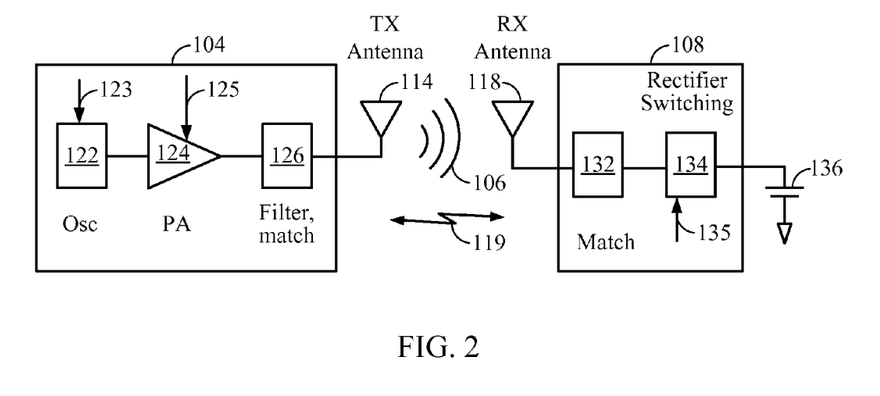
FIG. 2 shows a more detailed block diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator 122 is configured to generate at a desired frequency, such as 13.5 MHz, which may be adjusted in response to adjustment signal 123. An alternative uses LF frequencies, e.g., 135 Khz. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118.

Figure 3:
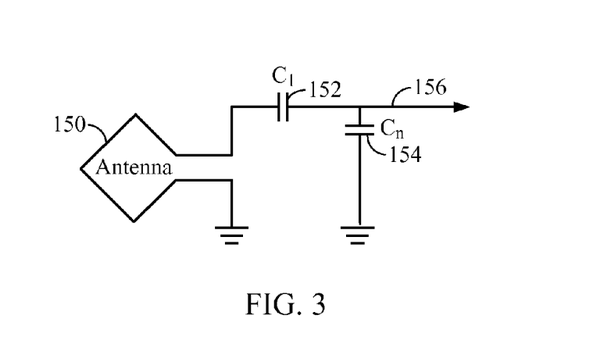
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Using a ferrite core may decrease the effect of extraneous objects. However, ferrite cores may need a certain length to be effective, which may be difficult when used in a vehicle. Air disk coils are considered more suitable for integration in car and for embedding in the ground. LF Ferrites may be used as magnetic shield to prevent fields generating eddy currents in metallic parts of the antenna surrounding.

Efficiency may be improved by keeping other devices outside of the core area.

Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems because magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

It should be noted that the foregoing approach is applicable to variety of communication standards such as CDMA, WCDMA, OFDM, and so forth. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Exemplary embodiments of the invention are directed to (or include) the following.

Resonant charging is believed by the inventors to be the best way of charging because there is less heating and better efficiency for a same size coil. Accordingly, the exemplary embodiments describe a magnetically coupled system.

In an exemplary embodiment, it can be theoretically shown that the maximum transferable power depends on the size of the radiating structure (coil diameter), the coupling factor between primary and secondary, and the quality factor (Q-factor) of the primary and secondary.

Size and coupling factor have a strong impact on radiation level, limiting the distance and maximum transferable power. This is believed due to the fact that while transferred power is maintained constant, the amount of reactive energy stored in the magnetic field surrounding the coils rapidly increases if the secondary is dislodged from the primary so that coupling becomes weaker.

An improved Q-factor results in higher transfer efficiencies and lowers radiation levels, thus allowing for higher transferable power.

To demonstrate the relationship of coupling factor and maximum transferable power, a hypothetical energy transfer system formed of two identical circular coils is assumed for an exemplary embodiment. Both primary and secondary are tuned for resonance at 135 KHz using an appropriate capacitor. The coil parameter and the Q-factors of the resonant circuits are listed in Table 1. This can be considered as an example of coils that can be used in an exemplary embodiment.

TABLE 1

| Parameter | Unit | Primary | Secondary |
| --- | --- | --- | --- |
| Coil outer radius | cm | 8 | 8 |
| Coil inner radius | cm | 6.5 | 6.5 |
| Coil axial width | cm | 1 | 1 |
| Number of turns |  | 66 | 66 |
| Coil area | $m^2$ | 0.0201 | 0.0201 |
| Q-factor of resonator |  | 250 | 250 |

The applicable H-field strength limit at 135 kHz and for the given coil area is 57 dBuA/m at 10 m of distance, see European Norm EN 300330 (short range devices).

Table 2 indicates the resulting r.m.s. currents and voltage in the primary coil. The Table 2 shows thousands of volts of voltage on the primary coil, thus demonstrating the high voltage within the coils. This can be challenging with respect to power/heat dissipation and withstanding voltage.

TABLE 2

| Distance [cm] | Coupling factor [%] | Efficiency [%] | Maximum transferable power under H-Field limit [W] | Primary coil current [A] | Primary coil voltage [V] |
|---|---|---|---|---|---|
| 1 | 74 | 99 | 4314 | 1.3 | 3077 |
| 2 | 51 | 98 | 3392 | 2.1 | 2545 |
| 4 | 30 | 97 | 2118 | 2.4 | 2373 |
| 8 | 12 | 94 | 664 | 2.6 | 2434 |
| 16 | 3 | 77 | 198 | 3.0 | 2776 |
| 32 | 1 | 47 | 53 | 3.3 | 3076 |

Table 2 actually shows the so called median distance, which is the coil center to center distance, which is for a 1 cm thick coil of an exemplary embodiment. Accordingly, the actual distance between the surfaces of the coil is the distance in centimeters minus 1 cm. Therefore, the 1 cm distance in Table 2 is a value approaching zero: the smallest possible distance between the coils.

Battery electric vehicles or "BEV"s are known to support a limited driving radius. An exemplar embodiment describes a wireless solution for recharging BEVs.

Figure 4:
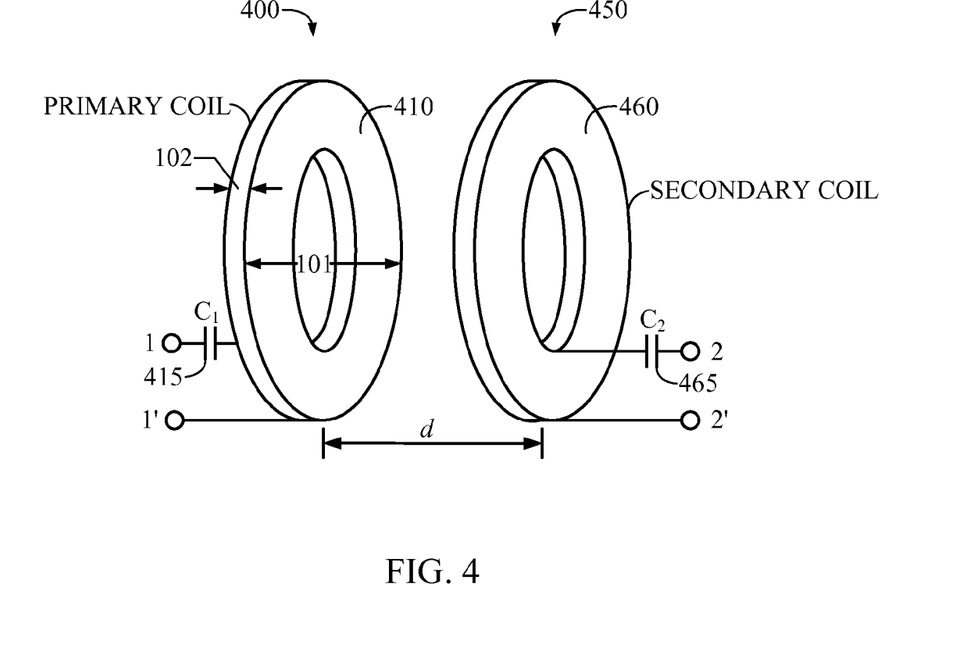
FIG. 4 shows two disk-shaped coils of similar size used for primary and secondary.

An exemplary embodiment illustrated in FIG. 4 forms a primary or transmitter 400 and a secondary or receiver 450. Each of the primary and the secondary uses disk-shaped coil of similar size. The primary coil 410 is a disk-shaped or 'pan cake' coil with its radial width larger than its axial width. The coils are dimensioned to handle high power and sustain the resulting high AC voltages and currents that will be produced, for example, those set forth in Table 2. In an exemplary embodiment, the receive coil 460 has the same size and characteristics as the transmit coil. Coils may also be formed of insulated Litz wire.

To minimize radiated fields, coil diameter should be as small as possible. However, in an exemplary embodiment, the coils should be sufficiently large to handle the high power and to allow for some relative positioning error that will generally be present in vehicular applications.

Resonance at the operating frequency is achieved by adding an appropriate value high-Q capacitor in series with the coils. FIG. 4 shows capacitor 415 in series with transmit coil 410, and shows capacitor 465 in series with receive coil 460. In an exemplary embodiment, both capacitors are dimensioned to withstand the high AC voltages set forth in Table 2.

Figure 5:
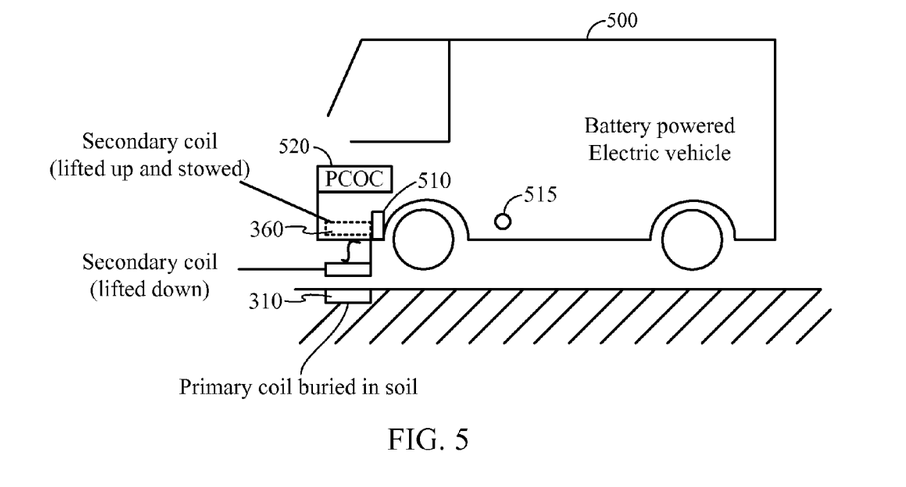
FIG. 5 shows how the secondary is lowered down to achieve close proximity coupling.
Figure 6:
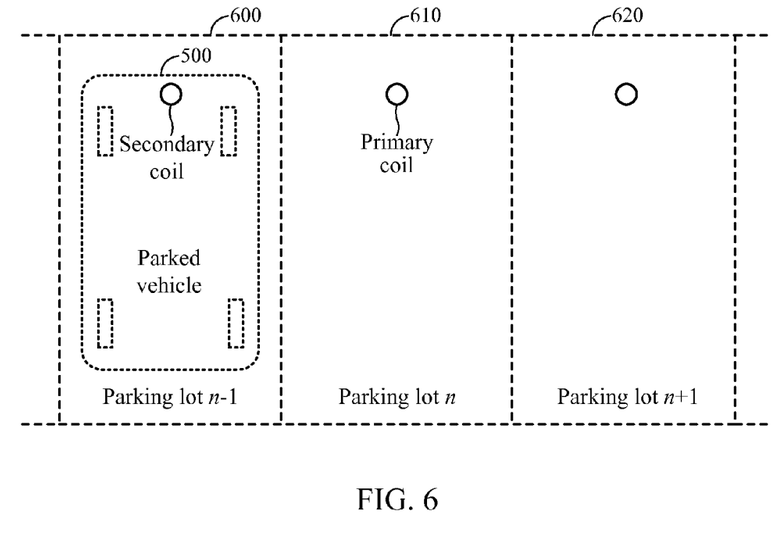
FIG. 6 shows how a vehicle is charged when the coils are coaxial.

In an exemplary embodiment, the primary coil 310 that delivers the charging power to the vehicle may be completely buried into the soil of a parking lot at a position corresponding to where the secondary coil 360 is likely to be on a vehicle. By putting the primary coil in the ground, it can be run from a higher voltage, for example 220V or 440V. The coil is located so that vehicles of different size and length are properly parked when primary and secondary are coaxially aligned. FIGS. 5 and 6 show the arrangement where the BEV 500 has coil 360 mounted on a lifting mechanism 510 that controls lifting and lowering the coil.

The operation may be controlled by a processor 520 in the vehicle 500. Once the coils are coaxially aligned and the primary is detected, the secondary 460 is lowered down to achieve close proximity coupling to the primary 410 as shown in FIG. 5. Then the processor may control initial tests to check coupling and efficiency of the power transfer between primary 410 and secondary 460. The tests can be used to adapt the link. Power transfer can start upon successful completion of these tests.

In another exemplary embodiment, there can be z axis control in addition to x-y fine positioning control.

FIG. 6 illustrates how the vehicle 500 can park in any of the spaces 600, 610 and 620. Each of these spaces has an embedded and energized primary coil that can be used to charge the vehicle.

Figure 7:
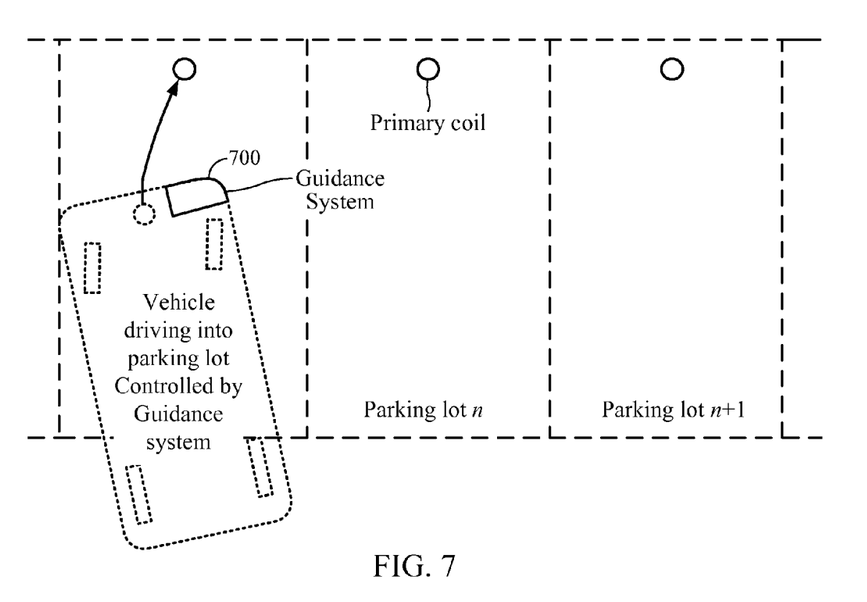
FIG. 7 illustrates a vehicle controlled by a guidance system.

An exemplary embodiment in FIG. 7 may use a guidance system 700 to assist the driver (or an autopilot in case of an automatically driven vehicle) to accurately position the vehicle. The guidance system may rely on radio positioning principles using the LF or HF band. For example, an exemplary embodiment may sense a degree of coupling between the primary 410 and secondary 460. The amount of coupling can be detected, for example by the vehicle receiving power from the primary. The guidance system can produce an output indicative of the degree, e.g., a sound or display.

Figure 8:
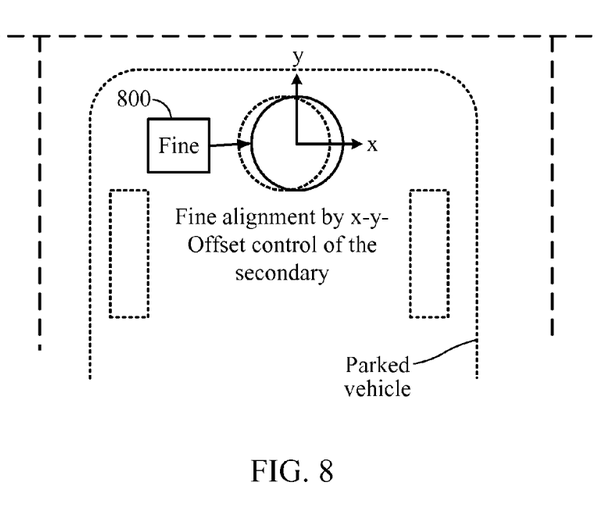
FIG. 8 shows fine alignment by x-y offset control of the secondary.

The vehicle-mounted subsystem may additionally provide an x-y offset control 800 for the secondary coil in another exemplary embodiment shown in FIG. 8. The guidance system would only be used for coarse positioning only, while the x-y offset control would adjust the fine alignment to allow better coupling between the coils.

Figure 9:
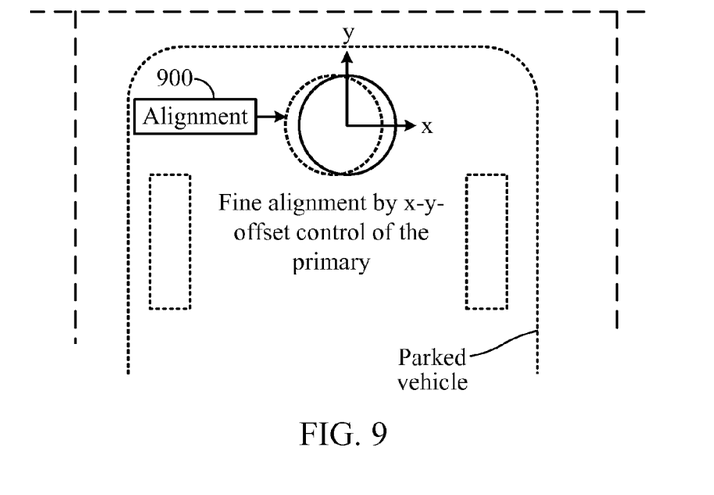
FIG. 9 shows fine alignment by x-y offset control of the primary.

Alternatively or in addition, the exemplary embodiment of FIG. 9 defines an alignment control 900 as part of the primary subsystem. This may provide x-y offset control that moves the primary coil 410.

Figure 10:
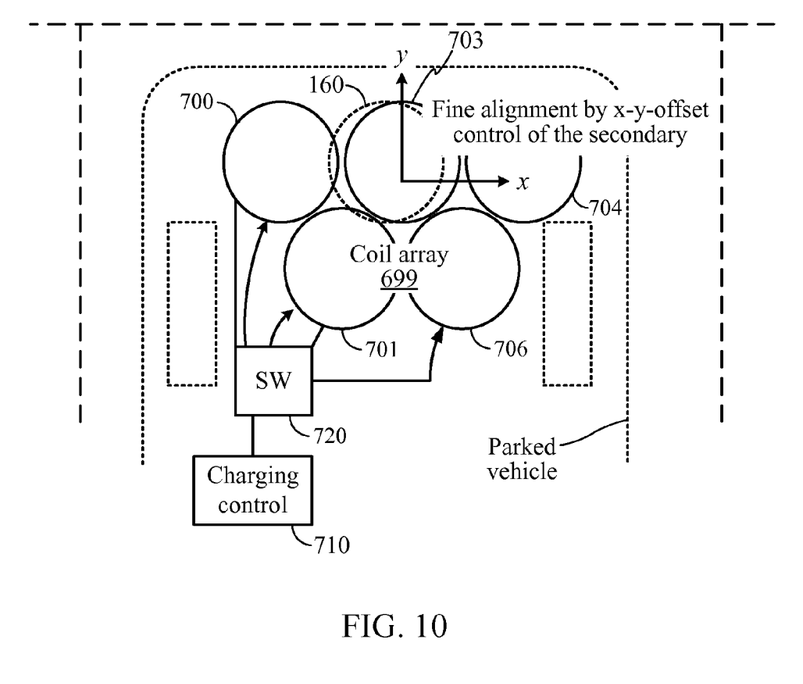
FIG. 10 shows the fine alignment by x-y offset control of the secondary above an array of primary coils.

In another exemplary embodiment shown in FIG. 10, an array of primary coils 699 is used instead of a single coil. The array includes closely packed coils 700, 701, 702, 703, 704. While this exemplary embodiment shows five such coils, any number can be used between 3 and 15 coils, for example.

A charging control 710 is connected by a switch box 720 to each of the coils. By testing coupling to a secondary, the charging control 710 selects the primary coil of the array 699 that is closest to the secondary 160. In addition, the secondary may also be aligned to the primary that is closest using the x-y offset control of the BEV as in the other exemplary embodiments. In one exemplary embodiment, only one primary will be active for wireless charging once the link is established. All other primaries are deactivated. This exemplary embodiment may also use x-y control of the primaries, by allowing fine movement of these primaries to match the location of the secondary.

Another exemplary embodiment describes a robotic vehicle that carriers the primary and which automatically moves below the vehicle to the position of the secondary.

Another exemplary embodiment comprises a human presence detector that may be used to detect when a human is entering or exiting the vehicle. This can use, for example, an infrared detection system that uses infrared sensors such as 215 located at various places near the vehicle. When the infrared detection system detects heat of a type that is likely to represent a person, it outputs a signal indicative of the presence of a person. In an exemplary embodiment, detection of a person causes the charging to terminate. This may alleviate certain fears that the magnetic charging is otherwise unhealthy.

Another exemplary embodiment may include a circuit that automatically detects the field strength, for example, the FCC field strength and automatically maintains the values below the FFC limits.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A transmitter system for wireless power, comprising:
a transmitting antenna including an inductive element and a capacitor, said transmitting antenna being resonant at a first frequency, said transmitting antenna being configured to generate a wireless field for charging a device including a receiving antenna;
a charging control system coupled to said transmitting antenna and configured to generate a signal at said first frequency and provide said signal to said transmitting antenna; and
an alignment controller configured to test coupling of said transmitting antenna to the receiving antenna in the first alignment position and based on a degree of the coupling, the alignment controller further configured to adjust an x-y alignment of the transmitting antenna relative to the receiving antenna from the first alignment position to a second alignment position having a finer alignment between the receiving antenna and the transmitting antenna than the first alignment position to improve said coupling.

2. The transmitter system of claim 1, wherein said first frequency is 135 kHz.

3. The transmitter system of claim 2, wherein said transmitting antenna is a coil having a radial width larger than its axial width.

4. The transmitter system of claim 1, wherein said transmitting antenna includes an array of antennas that extend over a specified area of a parking space.

5. The transmitter system of claim 4, wherein said charging control system is further configured to select one of said antennas of said array.

6. The transmitter system of claim 5, further comprising a switching device connected between the charging control system and each of the antennas of the array, the switching device configured to transmit the signal to the selected antenna of the array.

7. The transmitter system of claim 1, wherein said charging control system configured to generate a signal of a type that, when output to said transmitting antenna, transmits power to a remote receiving antenna.

8. A receiver system for wireless power, comprising:
a receiving antenna coupled to a device, the receiving antenna including a coil and capacitor that are resonant at a first frequency;
a guidance controller configured to guide the receiving antenna of the device to a first alignment position relative to a transmitting antenna that is not physically connected to said device coupled to the receiving antenna;
a lifting device for said receiving antenna configured to lift and lower said receiving antenna; and an alignment controller configured to sense a degree of coupling of said receiving antenna and the transmitting antenna based on a detection of the coupling that is measured at the receiving antenna, the alignment controller being further configured to move said receiving antenna from the first alignment position to a second alignment position to better align the receiving antenna with the transmitting antenna.

9. The receiver system of claim 8, further comprising an x-y alignment control configured to automatically align said receiving antenna to better align the receiving antenna with the transmitting antenna by moving said receiving antenna in x and y directions based on a degree of coupling between the receiving antenna and the transmitting antenna.

10. The receiver system of claim 8, further comprising circuitry that receives a magnetically induced signal from said receiving antenna and produces power therefrom.

11. The receiver system of claim 10, wherein said circuitry is resonant at 135 kHz.

12. The receiver system of claim 8, wherein said receiving antenna and said lifting device are part of a battery operated vehicle.

13. A method, comprising:
    guiding a receiving antenna of a vehicle to a first alignment position relative to a transmitting antenna;
    responsive to detecting a degree of coupling in the first alignment position between the receiving antenna and the transmitting antenna that is measured at the receiving antenna, moving one of the receiving antenna and the transmitting antenna from the first alignment position to a second alignment position to improve alignment of the receiving antenna with the transmitting antenna and improve the degree of coupling.

14. The method of claim 13, wherein moving one of the receiving antenna and the transmitting antenna comprises moving the receiving antenna laterally relative to the transmitting antenna.

15. The method of claim 13, wherein moving one of the receiving antenna and the transmitting antenna comprises moving the transmitting antenna laterally relative to the receiving antenna.

16. The method of claim 13, wherein moving one of the receiving antenna and the transmitting antenna comprises moving the receiving antenna along an axis that is perpendicular to one of a transmitting antenna coil and a receiving antenna coil.

17. The apparatus of claim 1, wherein the transmitting antenna is embedded in the ground.

18. The apparatus of claim 1, wherein the coupling test comprises a measurement of the amount of power that is transferred to the receiving antenna.

19. The apparatus of claim 8, wherein the sensed degree of coupling comprises a measurement of the amount of power that is transferred to the receiving antenna.

* * * * *